(12) United States Patent
Eul et al.

(10) Patent No.: US 11,878,584 B2
(45) Date of Patent: Jan. 23, 2024

(54) DRIVING JOYSTICK ASSEMBLY FOR A CONSTRUCTION MACHINE

(71) Applicant: JOSEPH VOEGELE AG, Ludwigshafen/Rhein (DE)

(72) Inventors: Achim Eul, Mannheim (DE); Karl-Heinz Jungmann, Biblis (DE)

(73) Assignee: Joseph Voegele AG, Ludwigshafen/Rhein (DE)

( * ) Notice: Subject to any disclaimer, the term of this patent is extended or adjusted under 35 U.S.C. 154(b) by 424 days.

(21) Appl. No.: 17/195,960

(22) Filed: Mar. 9, 2021

(65) Prior Publication Data
US 2021/0276418 A1 Sep. 9, 2021

(30) Foreign Application Priority Data
Mar. 9, 2020 (EP) .................................. 20161839

(51) Int. Cl.
*B60K 26/02* (2006.01)
*G05G 1/04* (2006.01)
(Continued)

(52) U.S. Cl.
CPC ............. *B60K 26/02* (2013.01); *G05G 1/015* (2013.01); *G05G 1/04* (2013.01); *G05G 5/005* (2013.01);
(Continued)

(58) Field of Classification Search
CPC ............. B60K 26/02; B60K 2026/029; B60K 2370/135; G05G 1/015; G05G 1/04; G05G 5/005; G05G 5/00; G05G 5/03; G05G 5/26; G05G 5/02; G05G 5/06; G05G 5/065; G05G 5/08; G05G 5/12; G05G 5/14; G05G 5/16; G05G 25/00; G05G 25/04; G05G 2505/00; G05G 2700/16; G05G 2009/04755; G05G 2009/0474; G05G 2009/04766; G05G 2009/04703; G05G 9/047; E01C 19/48; E01C 19/42;
(Continued)

(56) References Cited

U.S. PATENT DOCUMENTS 2,939,332 A 6/1960 Peterson
8,261,629 B2 9/2012 Barnabo et al.
(Continued)

FOREIGN PATENT DOCUMENTS

DE 102007057600 A1 * 6/2008 ............. B63H 21/22
DE 10 2009 009312 A1 8/2010
(Continued)

OTHER PUBLICATIONS

European Search Report dated Sep. 4, 2020, Application No. 20161839.4-1009—Applicant Joseph Voegele AG, 10 Pages.

*Primary Examiner* — Keith J Frisby
(74) *Attorney, Agent, or Firm* — Brooks Kushman P.C.

(57) ABSTRACT

A driving joystick arrangement for a construction machine comprises an operating lever and a basic housing, wherein the operating lever is pivoted in the basic housing, and the basic housing comprises a shift gate through which the operating lever extends. The operating lever comprises, at least in sections, a material which is suited and arranged in the operating lever such that a position of the operating lever relative to the basic housing can be detected by means of the Hall sensor.

20 Claims, 6 Drawing Sheets

(51) Int. Cl.
*G05G 5/00* (2006.01)
*G05G 5/03* (2008.04)
*G05G 5/26* (2006.01)
*G05G 25/00* (2006.01)
*G05G 1/015* (2008.04)
*E01C 19/48* (2006.01)

(52) U.S. Cl.
CPC ............. *G05G 5/03* (2013.01); *G05G 5/26* (2013.01); *G05G 25/00* (2013.01); *B60K 2026/029* (2013.01); *E01C 19/48* (2013.01); *E01C 2301/04* (2013.01); *G05G 2505/00* (2013.01); *G05G 2700/16* (2013.01)

(58) Field of Classification Search
CPC ...... E01C 19/22; E01C 19/4833; E01C 19/40; E01C 19/405; E01C 2301/04; E01C 23/00; E02F 9/2004; E02F 9/20; E02F 9/00; G01B 7/003; G01B 7/00; B60Y 2200/221; B60Y 2400/3012; A61G 2203/14

USPC ......................................................... 180/332
See application file for complete search history.

(56) References Cited

U.S. PATENT DOCUMENTS

| 10,394,272 | B1 | 8/2019 | Leckenby et al. |
| 10,618,392 | B2 | 4/2020 | Buschmann |
| 2004/0168539 | A1 | 9/2004 | Rosencrantz |
| 2013/0082161 | A1* | 4/2013 | Eul ............... B60Q 1/247 362/546 |
| 2019/0294195 | A1 | 9/2019 | Stoffers et al. |

FOREIGN PATENT DOCUMENTS

| EP | 3 412 830 A1 | 12/2018 |
| JP | 2007 323188 A | 12/2007 |

* cited by examiner

DRIVING JOYSTICK ASSEMBLY FOR A CONSTRUCTION MACHINE

CROSS-REFERENCE TO RELATED APPLICATIONS

This application claims foreign priority benefits under 35 U.S.C. § 119(a)-(d) to European patent application number EP 20161839.4, filed Mar. 9, 2020, which is incorporated by reference in its entirety.

TECHNICAL FIELD

The present disclosure relates to a driving joystick assembly, an operating panel for a construction machine, and a construction machine itself.

BACKGROUND

To operate construction machines, in most cases, operating panels or consoles are provided which comprise, apart from switches and buttons, also operating levers, so-called joysticks. The joysticks can be used for controlling tools of the construction machine, such as a bucket, or for moving and driving the construction machine. The joysticks can in most cases detect the direction and the absolute distance of its deflection, in some variants also a strength against a mechanical resistance force. Depending on the type of the joystick, different degrees of freedom are possible for the deflection. Operating panels with joysticks are often arranged on a control platform of a construction machine, wherein the control platform is covered with a roof, but often not completely enclosed. In this way, the joystick is also exposed to environmental and weather influences.

SUMMARY

It is an object of the present disclosure to provide a reliable driving joystick assembly that is robust against external influences.

This object is achieved by a driving joystick assembly having an operating panel according to the disclosure, or a construction machine according to the disclosure.

A driving joystick assembly for a construction machine according to the disclosure (i.e., a joystick arrangement for operating or controlling a travel drive of the construction machine) comprises an operating lever and a basic housing, the operating lever being pivoted in the basic housing, and the basic housing having a shift gate through which the operating lever extends. The operating lever has, at least in sections, in particular at a section facing the basic housing, a material which is suited and arranged in the operating lever such that a position of the operating lever relative to the basic housing can be detected by means of a Hall sensor. In this way, the deflection of the operating lever is translated into electric signals by the Hall sensor which are forwarded to an electronic control of the construction machine. The Hall sensor and the operating lever are mounted without mutual contact, and no electric or mechanical sensors are required at the operating lever itself. Thus, the Hall sensor can be encapsulated in an operating panel of the construction machine in an airtight and watertight manner, and the driving joystick assembly can be placed onto this operating panel. A penetration of water and dirt into the driving joystick assembly, which is principally possible due to the movability of the operating lever relative to the basic housing, thus has no longer any effect on the functioning of the driving joystick assembly since there are no electronic components or ports exposed to the surrounding area. The manufacture and assembly of the driving joystick assembly is correspondingly easier and cheaper, also due to the fact that no cover and insulation of ports are required.

Suitably, the operating lever comprises, at least in sections, a ferromagnetic and/or magnetic material. In the first variant, the movement of the ferromagnetic material causes a change of the magnetic field of a magnet encapsulated with the Hall sensor. To this end, the operating lever can comprise, for example, a spiked pattern, similar to that of a gearwheel. In the second variant, for example, magnets can be arranged in the operating lever in an alternately changed orientation, the Hall sensor detecting the movement of these magnets.

Ideally, the operating lever can be pivoted from a zero position to two sides. Thereby, the driving joystick assembly is in particular suited as a main controller for a construction machine, for example a road finishing machine or feeder, as the direction of travel to the front and rear can be determined. The degree of the deflection or the angle of rotation of the operating lever will then be proportionally converted into a speed. The centric zero position corresponds to a drive stop.

In an advantageous variant, the driving joystick assembly comprises a locking mechanism which prevents a movement of the operating lever out of a zero position or beyond the latter. Moreover, the operating lever comprises an unlocking knob by means of which the locking mechanism can be unlocked. In this way, the construction machine cannot unintentionally jerkily change its direction of travel or be caused to drive by tipping against the operating lever or by a faulty operation. Thus, persons standing by are protected from a collision, but also the operator of the construction machine is protected from falling down. Moreover, an engine is protected from damage.

Preferably, the operating lever comprises a projection and the basic housing a groove, or vice-versa, so that both mutually engage in a zero position of the operating lever, and moving the operating lever out of the zero position or beyond the latter is done against a mechanical resistance. Thereby, an operator can shift the operating lever into the zero position and will feel a latching effect there, whereby he can be sure that the construction machine is standing still. It is thereby also possible to shift the operating lever into the zero position without having to look at the driving joystick assembly.

In a suitable variant, the driving joystick assembly comprises a friction brake which arrests the respective position of the operating lever. In other words, the operating lever has a resistance even when it is moved outside the zero position, so that the operating lever can be moved with a comfortable force and maintains, when it is released, the respective position which can correspond to a direction and speed of travel. In other variants, when the driving joystick assembly is, for example, not used as the main controller, it is, however, also possible to provide a spring mechanism which automatically returns the operating lever to the zero position.

Preferably, the operating lever at the basic housing is exchangeable. Thus, different design and ergonomic variants can be realized. In particular, only the visible parts of the operating lever might be exchangeable.

In a preferred variant, the driving joystick assembly comprises an opening which permits the draining of water that has penetrated into the driving joystick assembly. It would make sense for the opening to be embodied in the lowermost region, for example, at a lower edge of the basic housing. In this way, water that has penetrated, for example, through the shift gate, can completely drain, and no cumbersome measures, such as a cover of the shift gate with a packing, must be taken to prevent the penetration of water, all the more as these measures taken up to now are not completely effective, as experience showed.

In a further advantageous variant, the basic housing has a section at least essentially having the shape of a circular arc and surrounding the shift gate, and the operating lever comprises an upper part at least partially overlapping the shift gate which comprises a corresponding section having the shape of a circular arc. Thus, the operating lever can be in particular mounted to be rotatable about one single axis. Since the operating lever and the basic housing have opposed sections having the shape of a circular arc, an optionally existing distance or gap between the two will always remain the same even if the operating lever is deflected. However, it is also conceivable to choose such materials that a slight rubbing against each other is possible.

In one variant, a section of the operating lever extending within the basic housing is shaped to abut against the shift gate from the bottom and to cover it in any position of the operating lever from the bottom. This section can be large enough to cover the shift gate in any deflection of the operating lever. To this end, the section of the operating lever can be shaped, e.g., as a circular cylinder (part). It is also conceivable to only dispose flat, flexible sections or tabs at the operating lever which cover the shift gate from the bottom and flexibly press against it with a certain pretension, for example. Thus, the shift gate does not leave any major openings, and a penetration of rather large particles of dirt is prevented.

It is conceivable that the section of the operating lever extending within the basic housing and abutting against the shift gate from the bottom has the shape of a section of a cylinder jacket. It is also conceivable that the respective section of the operating lever comprises a projection protruding into the shift gate and essentially or nearly filling the complete width of the shift gate. This causes, on the one hand, an even more secure and stable guidance of the operating lever relative to the basic housing. On the other hand, by the at least partial filling of the shift gate, the tendency of dirt accumulations is reduced. For the latter purpose, it would be ideal for the outer side of the projection to be flush with the regions of the basic housing adjacent to the shift gate, or to be located lower than these with an only minimal offset of, for example, less than 4 mm.

An operating panel according to the disclosure comprises a panel housing and a driving joystick assembly arranged on the panel housing according to one of the above-described variants. The panel housing comprises, in an interior space, the Hall sensor which is configured to detect the position of the operating lever of the driving joystick assembly contactlessly. The operating panel can comprise further operational controls, such as buttons or switches as well as indicating instruments. Moreover, a plurality of driving joystick assemblies can be arranged on the operating panel. The operating panel, and thus the Hall sensor, is closed in an airtight and watertight manner, and there are no connecting lines to the driving joystick assembly. Only the change of the magnetic field strength is perceived by the Hall sensor through the panel housing. Since the driving joystick assembly is a possible entry point for water due to its moving parts, but there is no connection to the interior of the panel housing and the electronic components located therein according to the disclosure, the functioning of the electronic operating panel will be unaffected at any time.

Preferably, the driving joystick assembly at the panel housing is exchangeable and can in particular be screwed on or plugged in or on. Thus, different design and ergonomic variants can be used, or in case of a damage, the driving joystick assembly can be exchanged. Bushings with internal threading or for plug-in connections can be shaped in the panel housing to this end, however, without any connection to the interior of the operating panel to maintain tightness. This can be done, for example, by casting the panel housing, which is otherwise typically thin, with correspondingly thicker regions from a plastic material. However, it is also conceivable to fix the driving joystick assembly by means of gluing, in particular hot gluing, where this gluing might be re-leasable, for example, by means of a blow dryer.

In a preferred variant, the operating panel comprises a recess at or in the panel housing, respectively, in which the driving joystick assembly can be at least partially positioned. Thus, the basic housing can be advantageously lowered, so that only the shift gate and the operating lever project from an even surface of the operating panel. This is particularly comfortable for an operator as the hand can be comfortably placed in this way. Moreover, the operating panel is optically more attractive in this way. Moreover, the recess functions as a positioning aid. The recess can be designed as a deep-drawn section of the panel housing, however, still without any connection or passage to the interior of the operating panel.

A construction machine according to the disclosure comprises an electronic control and an operating panel as described above, wherein the Hall sensor of the operating panel sends electric signals to the electronic control in response to the detected position of the operating lever, and the electronic control is configured to control functions of the construction machine, in particular a direction of travel and a travel speed, in response to the signals received from the Hall sensor. In particular, the speed of a main drive, for example a diesel engine, and the shifting to a suited gear can be controlled in this way. However, the control of hydraulic components or electric motors is also conceivable.

Preferably, the construction machine is a road finishing machine or a feeder vehicle. A driving joystick assembly of the type described above is here particularly suited as a main controller (i.e., as an operating element for controlling the travel drive of the construction machine) since the construction machine is in most cases moved at a constant and low speed in the laying operation.

BRIEF DESCRIPTION OF THE DRAWINGS

In the following, example embodiments according to the disclosure are described more in detail with reference to the figures.

Corresponding components are always provided with the same reference numerals in the figures.

DETAILED DESCRIPTION

Figure 1:
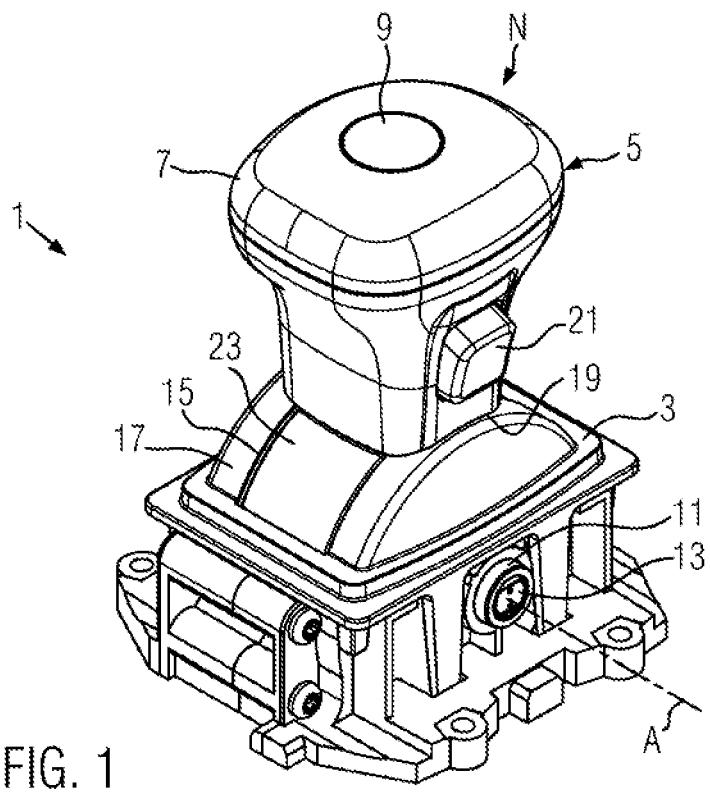
FIG. 1 shows a perspective view of a first embodiment of a driving joystick assembly.

FIG. 1 shows a first embodiment of a driving joystick assembly 1 with an operating lever 5 pivoted in a basic housing 3. The operating lever 5 has an upper part 7 in the form of a cap which is connected with an inner main part of the operating lever 5, for example, via a screw 9 or a clip, and is thus also removable. The operating lever 5 is mounted to be rotating/pivoting about an axis A, for which, for example, lateral cylindrical pins 11 can be mounted in corresponding recesses 13 of the basic housing 3. The operating lever 5 is located, in the shown picture, in a zero position N and can be deflected from it on either side within a shift gate 15. The shift gate 15, or an upper section 17 of the basic housing 3 surrounding the shift gate 15, is arched in the shape of a circular arc. The cap 7 comprises a correspondingly shaped lower section 19, so that there is a constant distance between the cap 7 and the upper section 17 of the basic housing 3. Laterally at the operating lever 5, an unlocking knob 21 is arranged which can be pushed to the inside to re-lease a locking mechanism which blocks the movement of the operating lever 5 out of the zero position N or beyond the latter. The operating lever 5 moreover has an inner section 23 which is also shaped like a circular arc at least in sections and covers the shift gate 15 in any position of the operating lever 5 from the inside.

Figure 2:
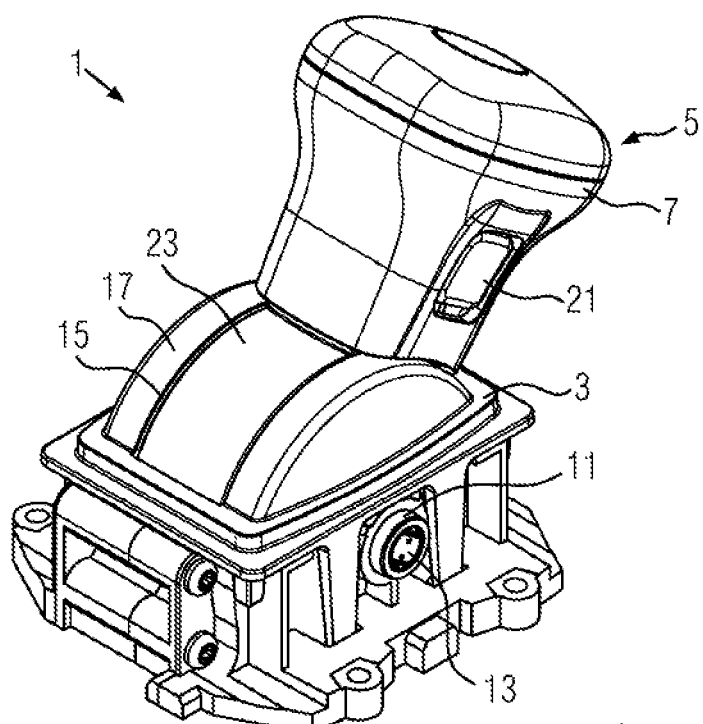
FIG. 2 shows a perspective side view of the driving joystick assembly.

FIG. 2 shows the driving joystick assembly 1 in a side view, wherein the operating lever 5 is deflected from a zero position N to the front. The unlocking knob 21 is located in an unlocked position pushed to the inside. The inner section 23 covers the shift gate 15 from the bottom also in this deflected position of the operating lever 5, so that the penetration of rather large particles of dirt can be prevented. The operating lever 5 is mounted in the recesses 13 of the basic housing 3 in a rotating manner by means of cylindrical pins 11.

Figure 3:
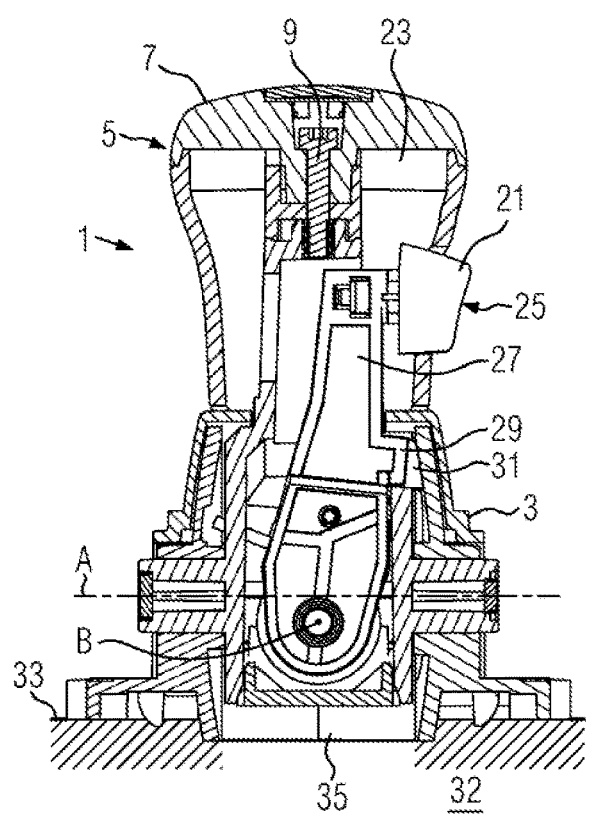
FIG. 3 shows a sectional view of the driving joystick assembly with a locking mechanism in a blocked state.

FIG. 3 shows a centric sectional view of the driving joystick assembly 1 with a locking mechanism 25 in a blocked state. The locking mechanism 25 comprises a catch lever 27 rotatable with the operating lever 5 about the axis A which typically also extends at least in sections through the operating lever 5. The catch lever 27 is additionally rotatable about an axis B transverse to the sense of rotation of the operating lever 5. To automatically provide the blocked state, the catch lever 27 is pretensioned with a spring to the outside. In the shown picture, the catch lever 27 is pushed to the right, so that the unlocking knob 21 projects to the outside beyond the cap 7. A nose 29 is formed at the catch lever 27 which engages with a projection 31 of the basic housing 3 in the zero position whereby the catch lever 27 and the operating lever 5 cannot be moved out of the zero position N. By pushing the unlocking knob 21 to the left against the spring tension, the locking mechanism 25 is released. In an interior space 32 of an operating panel 33, a Hall sensor 35 is arranged such that it is positioned sufficiently close to the operating lever 5 from the bottom to detect its movement or position. Furthermore, one can see in this picture that the upper part or the cap 7, respectively, of the operating lever 5 is releasably connected to the inner part 23 of the operating lever 5 by a screw 9.

Figure 4:
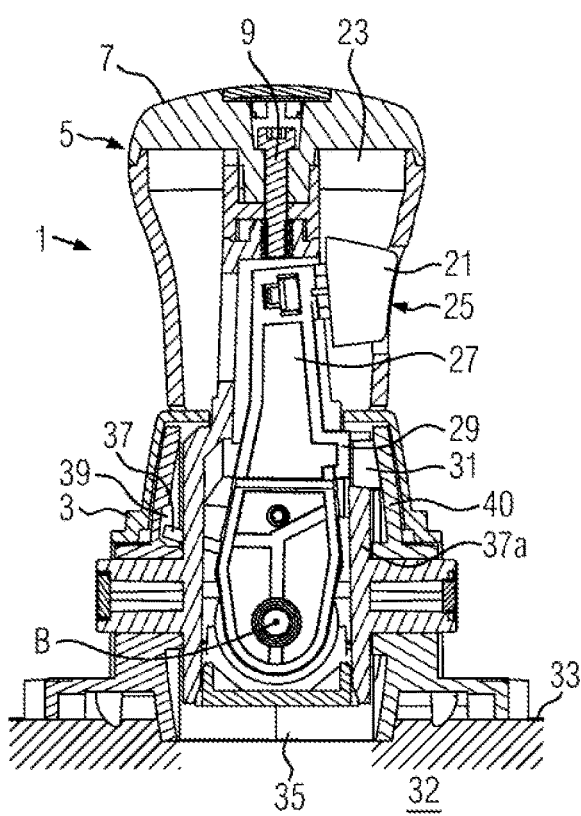
FIG. 4 shows a sectional view of the driving joystick assembly with a locking mechanism and an actuated unlocking knob.

FIG. 4 corresponds to the driving joystick assembly 1 of FIG. 3, however, with an unlocked locking mechanism 25. To this end, the unlocking knob 21 was pushed to the left or to the inside, respectively, so that the catch lever 27 rotates about the axis B to the left and does no longer overlap the nose 29 with the projection 31 of the basic housing 3. Thus, the operating lever 5 can be moved out of the zero position about the axis A, that means to the front and back. The projection 31 can to this end suitably be formed across the complete moving distance of the operating lever 5 at the inner side of the basic housing 3, all-over the surface or as a section having the shape of a circular arc, so that the nose 29 runs along the projection 31 outside the zero position, wherein the unlocking knob 21 remains sunk-in in the cap 7 according to FIG. 2. At the zero position N, meaning in the centric position, the projection 31 also has a recess, so that there, the nose 29 will engage in this recess due to the spring pretension. Thus, the operating lever 5 cannot be moved again out of the zero position N before the unlocking knob 21 is pushed again.

To obtain, even when the unlocking knob 21 is being pushed, a mechanical feedback in the form of a slight engagement during the passage through the zero position N, the operating lever 5 can comprise a further projection 37 which engages with a groove 39 at an inner side of the basic housing 3. The projection 37 can be shaped, for example, as a semi-circular nap, and the groove 39 can correspondingly be formed complementarily. Thus, they can be released from each other by a low expenditure of force and due to a low deformability of the components, for example of the basic housing 3. A second projection 37a, which can be arranged, for example, at an opposite side of the operating lever 5, or else the first projection 37 itself, can additionally, also during the complete rotary motion of the operating lever 5, run along an inner section 40 of the basic housing 3 with contact, a so-called friction brake 40, so that for moving the operating lever 5, a force overcoming the friction must be expended at any time. In this way, the operating lever 5 maintains its position even when it is released.

Figure 5:
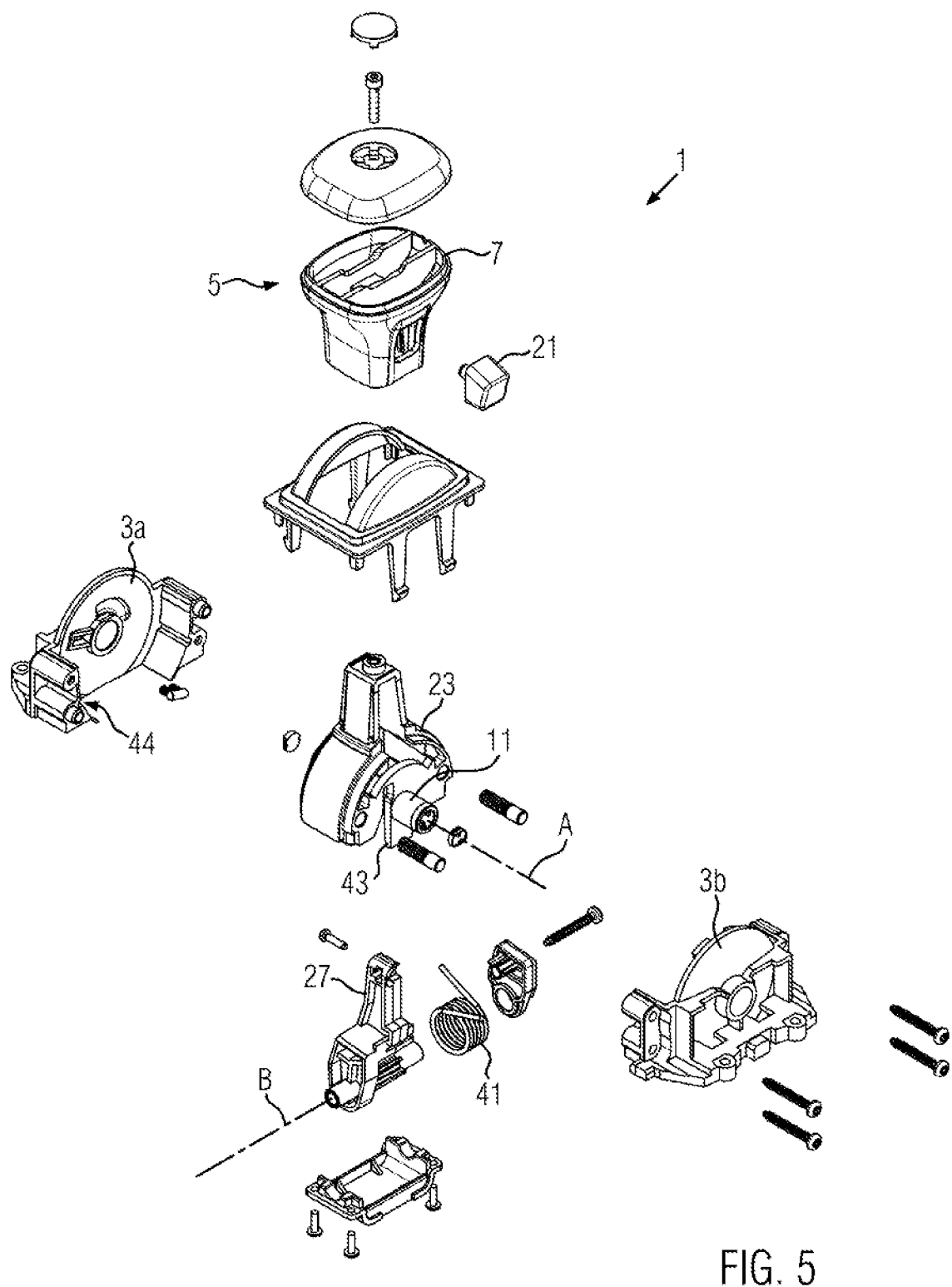
FIG. 5 shows an exploded view of the driving joystick assembly.

FIG. 5 shows the individual components of the driving joystick assembly 1 as an exploded view. The operating lever 5, as it is shown in FIGS. 1 to 4, comprises the upper part or the cap 7, respectively, and the inner section 23 with the cylindrical pins 11 disposed on either side. The inner section 23 of the operating lever 5 is mounted in the lateral parts 3a, 3b of the basic housing 3 by means of the cylindrical pins 11 to be rotating about the axis A. The operating lever 5 extends through the upper section 17 of the basic housing 3. Within the inner section 23 of the operating lever 5, the catch lever 27 as well as—by means of a spring 41—the unlocking knob 21, are additionally mounted to rotate about the axis B. The spring 41 provides the pretension of the knob 21 to the outside corresponding to the position in FIG. 3. At a lower side of the inner section 23, a suited material 43, for example magnetic or ferromagnetic structures 43, is arranged whose movement during the rotation of the operating lever 5 is detected by the Hall sensor 35 in the operating panel 33. The other components of the driving joystick assembly 1 and of the operating panel 33 can suitably be made of suited types of plastics. In the basic housing 3 or one of its side parts 3a, 3b, a water drainage opening 44 can be provided through which water penetrated into the driving joystick assembly 1 can drain.

Figure 6:
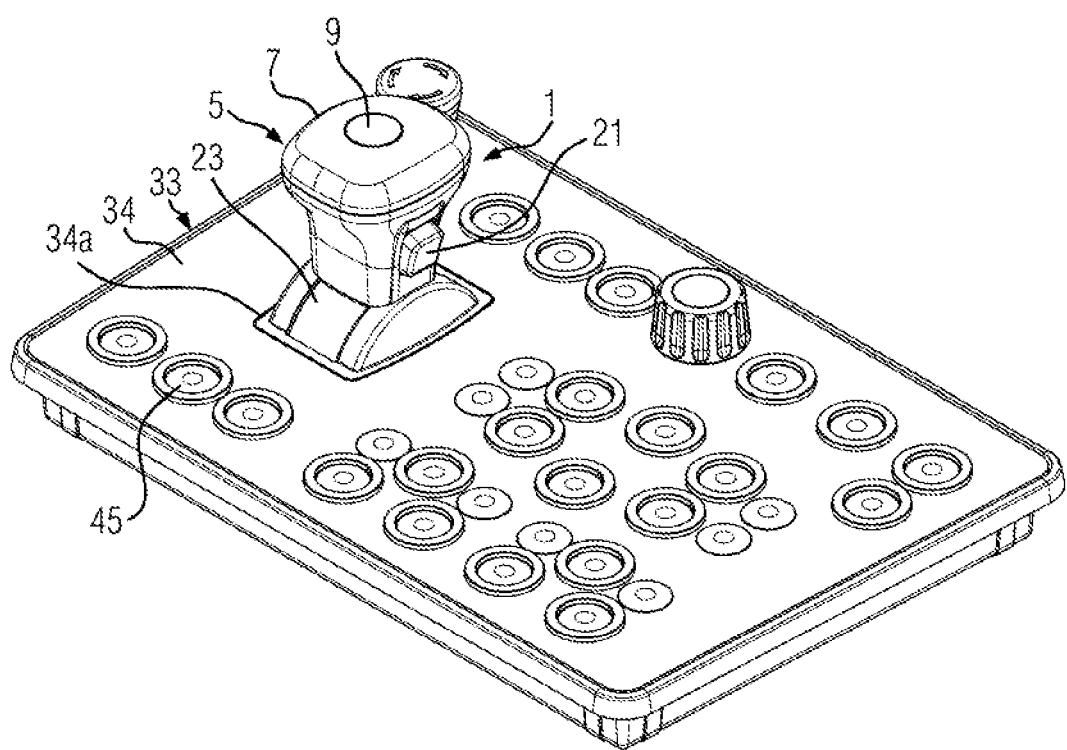
FIG. 6 shows a plan view of an operating panel with a driving joystick assembly.

FIG. 6 shows the operating panel 33 with the driving joystick assembly 1 and further operational controls 45 for controlling a construction machine. The driving joystick assembly 1 is arranged on a panel housing 34 comprising a recess 34a into which the driving joystick assembly 1 is at least partially introduced. This recess can be a deep-drawn, i.e., lowered, region of the panel housing 34, so that there is still no connection to an interior space 32 which accommodates the electronic components of the operating panel 33. It is, however, equally conceivable to provide the panel housing 34 as a second hull, so that, for example, the driving joystick assembly 1 is fitted into the panel housing 34 from the bottom, and both parts are then placed onto a third, watertight encapsulated part which contains the electronic components. The operating lever 5 is, in this representation, in a centric zero position corresponding to a stop or parking position of the construction machine. The operating panel 33 can be made in a plurality of design variants and also comprise, for example, indicating elements, such as liquid-crystal displays, and a plurality of driving joystick assemblies 1.

Figure 7:
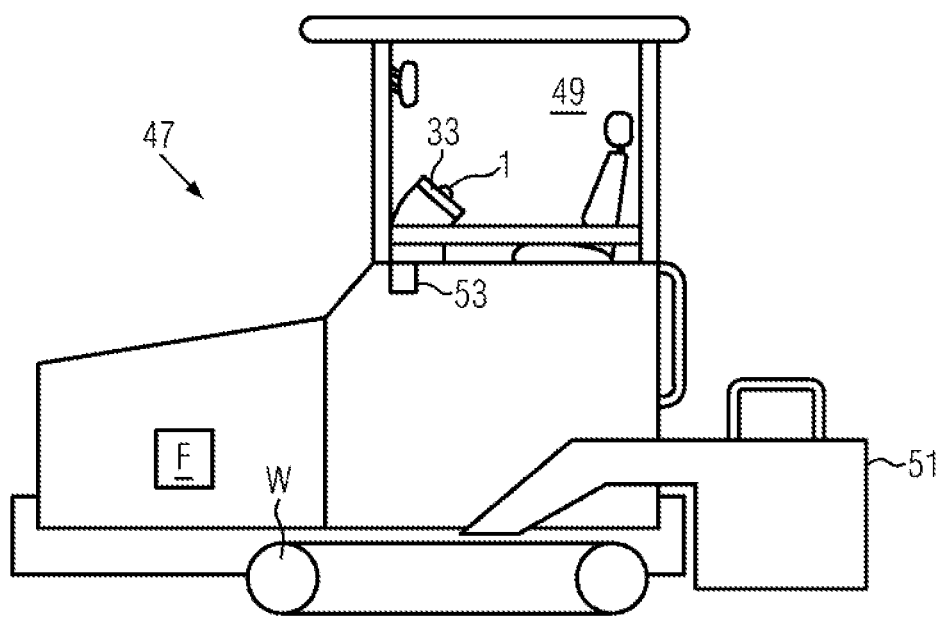
FIG. 7 shows a schematic view of a construction machine in the form of a road finishing machine with an operating panel with a driving joystick assembly.

FIG. 7 shows a schematic view of a construction machine 47 in the form of a road finishing machine with an operating panel 33 with a driving joystick assembly 1 for controlling a travel drive F. The operating panel 33 is here arranged on a main control platform 49, but can also be attached to a screed 51 or a control platform at the screed 51. The construction machine 47 comprises an electronic control 53 which receives the electric signals of the Hall sensor 35 of the operating panel 33 and controls corresponding components of the construction machine 47, for example a main drive F for a running gear W. The main drive can be, for example, a diesel engine, and the control 53 can correspondingly control the speed and the engaged gear.

Figure 8:
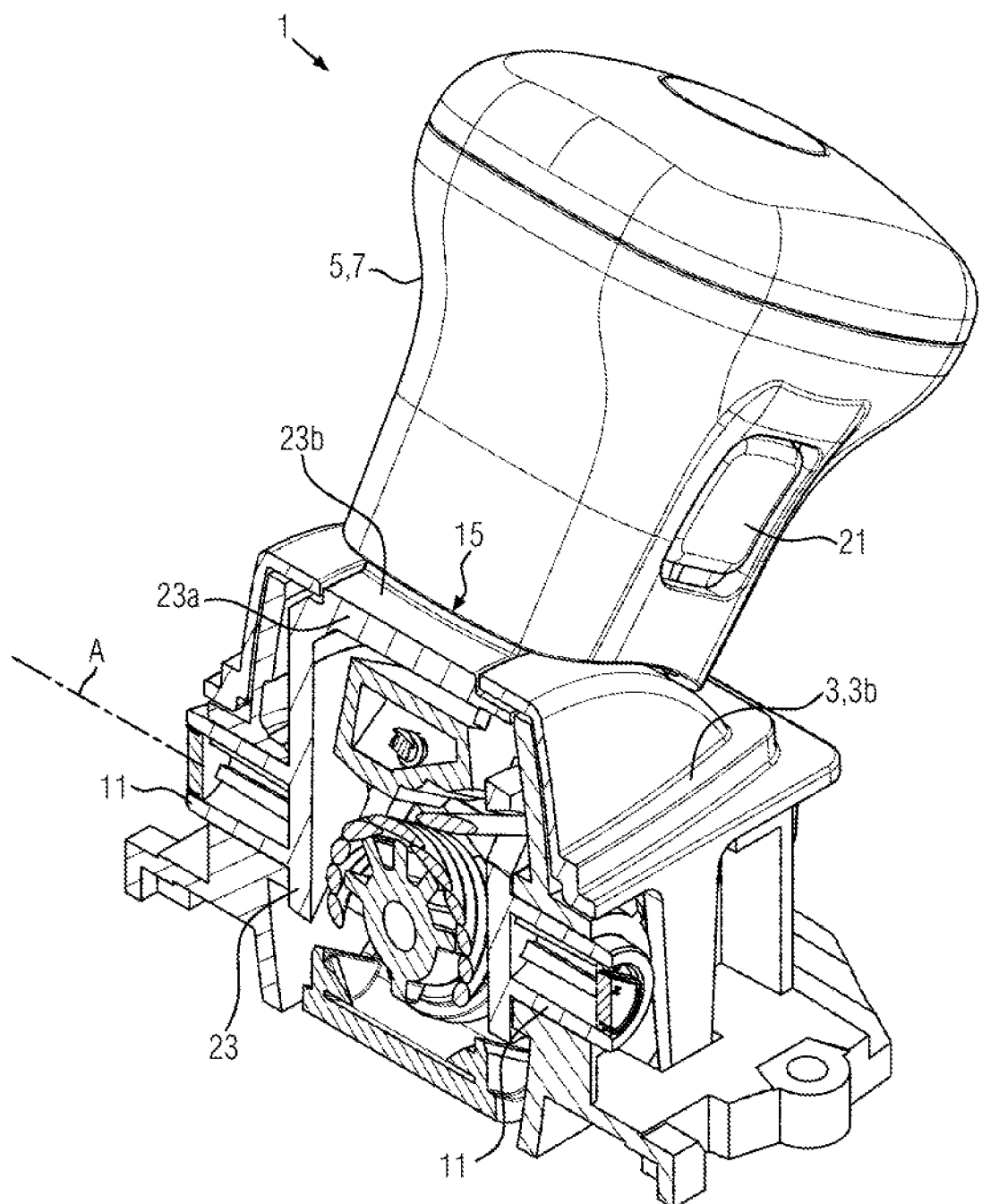
FIG. 8 shows a perspective view of the driving joystick assembly.

FIG. 8 shows a further, partially sectional perspective view of the driving joystick assembly with the operating lever 5. The unlocking knob 21 is here in its actuated position pushed to the inside; the operating lever 5 has been pivoted from the zero position N about the axis A to the front.

FIG. 8 shows that the inner section 23 of the operating lever 5 comprises a projection 23a protruding to the outside which protrudes into the exposed shift gate 15 and has, except for a minimal lateral gap of less than 2 mm, nearly the same width as the shift gate 15. The outer surface 23b of the projection 23a is flat and either flush with the adjacent regions of the basic housing 3 or minimally offset relative to the adjacent regions of the basic housing 3 (here by about 2 mm to the inside).

Starting from the above represented embodiments of a driving joystick assembly 1, a diversity of variations thereof is possible. It is, for example, possible to provide a pattern or a structure, respectively, at the inner side of the basic housing 3 where the operating lever 5 rubs along, e.g., also in connection with the friction brake 40, so that discrete lever positions can be repeatedly adjusted. For example, certain travel speeds can be reselected precisely. To this end, the pattern or the structure may be embodied such that an adjustment can only be performed discretely from one latching stage to the next one, or a continuous adjustment without any pattern can be provided, and only individual spaced-apart values can be felt by a latching. Furthermore, a diversity of design variants can be selected. To this end, the cap 7 can also be releasably attached instead of by means of a threaded joint by a pin-and-socket connection, for example, with an arrest by a projection. The same joystick arrangement can also be configured and connected for operating or controlling power units of the construction machine other than the travel drive; in this case, it would simply be designated as a "joystick arrangement".

What is claimed is:

1. A driving joystick assembly for a construction machine, comprising an operating lever and a basic housing, wherein the operating lever is pivotably mounted in the basic housing and the basic housing comprises a shift gate through which the operating lever extends, wherein the operating lever at least in sections comprises a material which is suited and arranged in the operating lever such that a position of the operating lever relative to the basic housing is detectable by means of a Hall sensor, and wherein the operating lever comprises a projection and the basic housing comprises a groove, or vice-versa, so that the operating lever and the basic housing are engaged in a zero position of the operating lever, and movement of the operating lever out of the zero position or beyond the zero position is done against a mechanical resistance.

2. The driving joystick assembly according to claim 1, wherein the material comprises a ferromagnetic and/or magnetic material.

3. The driving joystick assembly according to claim 1, wherein the operating lever is pivotable from the zero position towards two sides.

4. The driving joystick assembly according to claim 1 further comprising a locking mechanism which prevents a movement of the operating lever out of the zero position or beyond the zero position, and the operating lever comprises an unlocking knob by means of which the locking mechanism is unlockable.

5. The driving joystick assembly according to claim 1 further comprising a friction brake which arrests the respective position of the operating lever.

6. The driving joystick assembly according to claim 1, wherein the operating lever is exchangeable.

7. The driving joystick assembly according to claim 1 further comprising an opening which permits drainage of water that penetrates into the driving joystick assembly.

8. The driving joystick assembly according to claim 1, wherein the basic housing comprises a section having a shape of a circular arc and surrounding the shift gate, and the operating lever comprises an upper part at least partially overlapping the shift gate which comprises a corresponding section having a shape of a circular arc.

9. The driving joystick assembly according to claim 1, wherein a section of the operating lever extending within the basic housing is shaped such that it abuts against the shift gate from a bottom and covers the shift gate in any position of the operating lever from the bottom.

10. An operating panel, comprising a panel housing and the driving joystick assembly according to claim 1 arranged on the panel housing, wherein the panel housing comprises, in an interior space, the Hall sensor which is configured to contactlessly detect the position of the operating lever of the driving joystick assembly.

11. The operating panel according to claim 10, wherein the driving joystick assembly is exchangeable at the panel housing.

12. The operating panel according to claim 10, wherein the driving joystick assembly is screwed on or plugged in or on the panel housing.

13. The operating panel according to claim 10, wherein the panel housing defines a recess in which the driving joystick assembly can at least partially be positioned.

14. A construction machine, comprising an electronic control and the operating panel according to claim 10, wherein the Hall sensor of the operating panel is operable to send electric signals to the electronic control in response to the detected position of the operating lever, and the electronic control is configured to control functions of the construction machine in response to the electric signals received from the Hall sensor.

15. The construction machine according to claim 14, wherein the functions of the construction machine comprise a travel drive and a travel speed.

16. The construction machine according to claim 14, wherein the construction machine is a road finishing machine or a feeder vehicle.

17. A driving joystick assembly for a construction machine, the driving joystick assembly comprising:
   a housing that defines a shift gate; and
   an operating lever pivotably mounted to the housing and that extends through the shift gate, wherein at least a portion of the operating lever comprises a material which is arranged so that a position of the operating lever relative to the housing is detectable by a Hall sensor;
   wherein the housing comprises a section having a shape of a circular arc and surrounding the shift gate, and the operating lever comprises an upper part at least partially overlapping the shift gate which comprises a corresponding section having a shape of a circular arc.

18. The driving joystick assembly according to claim 17, wherein the material comprises a magnetic material or a ferromagnetic material.

19. A driving joystick assembly for a construction machine, comprising an operating lever and a basic housing, wherein the operating lever is pivotably mounted in the basic housing and the basic housing comprises a shift gate through which the operating lever extends, wherein the operating lever at least in sections comprises a material which is suited and arranged in the operating lever such that a position of the operating lever relative to the basic housing is detectable by means of a Hall sensor, and wherein a section of the operating lever extending within the basic housing is shaped such that it abuts against the shift gate from a bottom and covers the shift gate in any position of the operating lever from the bottom.

20. The driving joystick assembly according to claim 19, wherein the material comprises a ferromagnetic and/or magnetic material.

* * * * *